United States Patent
Stepanek

[11] Patent Number: 5,939,177
[45] Date of Patent: Aug. 17, 1999

[54] HOLOGRAPHICALLY TRANSFERABLE IMAGES

[75] Inventor: Michael J. Stepanek, Hollis, N.H.

[73] Assignee: Hampshire Holographic Manufacturing Corp., Milford, N.H.

[21] Appl. No.: 08/813,448

[22] Filed: Mar. 10, 1997

Related U.S. Application Data

[63] Continuation-in-part of application No. 08/679,347, Jul. 9, 1996, Pat. No. 5,662,986, and application No. 08/679,348, Jul. 9, 1996, Pat. No. 5,735,989.

[51] Int. Cl.[6] .................................................. B32B 3/00
[52] U.S. Cl. ......................... 428/195; 428/200; 428/209; 428/211; 283/86; 156/309.6
[58] Field of Search .................................. 428/195, 916, 428/200, 209, 211; 283/86, 94; 156/309.6

[56] References Cited

U.S. PATENT DOCUMENTS

| | | | |
|---|---|---|---|
| 4,728,377 | 3/1988 | Gallagher | 156/58 |
| 4,906,315 | 3/1990 | McGraw | 156/231 |
| 5,510,911 | 4/1996 | Sharpe et al. | 359/1 |
| 5,593,765 | 1/1997 | Sharpe et al. | 428/225 |
| 5,634,669 | 6/1997 | Colgate et al. | 283/58 |

Primary Examiner—Elizabeth Evans
Attorney, Agent, or Firm—Stephen W. White

[57] ABSTRACT

A holographic image that has been transferred from a conventional polymeric support to a wrapping paper element is described in this invention. A host of images may be envisioned and since this image, on a wrapping paper element, may then be wound up in a roll, it can be used as a wrapping element for a host of applications such as in wrapping of gifts and in papers used for advertising and the like. This element and process permits the wide spread use of such holographic images, such use not being available until now.

6 Claims, 2 Drawing Sheets

5,939,177

HOLOGRAPHICALLY TRANSFERABLE IMAGES

CROSS-REFERENCE TO RELATED APPLICATIONS

This application is a CIP of my previously filed applications U.S. Ser. No. 08/679,347, filed Jul. 9, 1996, now U.S. Pat. No. 5,662,986, issued Sep. 2, 1997, and U.S. Ser. No. 08/679,348, filed Jul. 9, 1996, now U.S. Pat. No. 5,735,989, issued Apr. 7, 1998.

BACKGROUND OF THE INVENTION

1. Field of the Invention

This invention relates to holographic images formed by a unique process for various security and decorative purposes. Also, this invention relates to aluminized roll-stock holographic images formed on a plastic layer. Further, this invention relates to elements and process for transferring holographic images to yet another substrate. Still further, this invention relates to a unique process for transferring holographic images to a relatively inexpensive substrate which permits a wide-spread use of said holographic image.

2. Description of the Prior Art

Holographically enhanced materials are well known in the prior art. These are usually made by very proprietary methods which includes passing a layer of plastic, for example, through a machine which imparts a variation (e.g. which can be an image itself within covering or upper strata of the plastic layer. This step is somewhat similar to, but not exactly the same, as embossing. A powdered metallic element (e.g. aluminum) is then applied thereon by the so-called metallizing process. After this step, the element appears to have a two or three dimensional diffractional grating holographic image imparted on the layer of plastic. This image is extremely pleasing and is widely used within the credit card and security industries, for example, to impart an image particular to that credit card or to provide a security element thereon. The resulting image is difficult to duplicate and thus these elements assist in the prevention of fraud by counterfeiting, for example. The draw-back to the use of these images is the cost since the machines to produce the image are complicated and costly in and of themselves. Additionally, holographic elements produced by this method (the so-called "shim" method") are usually small in size and thus cannot be imprinted with larger images. Thus, this material has not been widely used outside of the credit card and novelty industry.

Within the food packaging industry it is known use foils and the like for the wrapping of individual food pieces, for example. Sometimes, these foils are embossed with decorative or advertising logos and materials. In addition, it is known in this industry to laminate with glues metallized materials to paper elements for the wrapping of individual food pieces such as candies, gums and the like, for example. There is a long standing need, however, to provide paper wrapping elements with holographic surfaces for decorative and advertising purposes. Additionally, within gift wrapping industry, there has been a need to improve the appearance of the gift wrapping material so as to further enhance the gift wrapped therein.

Recently, a process for making large sheets of holographically enhanced material has been developed. Thus, the costs of such holographically enhanced material have been significantly reduced. However, these large sheets of material are usually placed on a plastic surface which is also rather expensive and thus the use of this material is still rather limited. If the holographic image could be further transferred to yet another substrate, one which was less expensive and one which had higher utility (wrapping papers such as those used to wrap gifts and the like, for example), the use of holographically prepared images would find wider use in decorative wrappings and in advertising, for example.

SUMMARY OF THE INVENTION

It is an object of this invention to provide a holographic image that can be transferred to another substrate. It is a further object to utilize a unique transferring process that can place a holographic image directly on a cheaper paper substrate such as a wrapping paper, for example. These and yet other objects are achieved in a paper wrapping element, said paper wrapping element having a holographic image having imparted thereon by laminating a metallized holographic image on a polymeric substrate to paper wrapping element under temperatures and pressure requisite to obtaining such lamination, and subsequently delaminating said paper wrapping element from said polymeric substrate wherein said holographic element is transferred to said paper wrapping element and said polymeric element can be metallized again for reuse.

In yet another embodiment, this invention may be achieved in a process for transferring a holographic image to a paper wrapping element by laminating a metallized holographic image, said image having been imparted on a polymeric substrate, to said paper wrapping element at a temperature greater than about 0° C. (about 32° F.) and a pressure greater than 0.15 pounds per square inch and subsequently delaminating said paper wrapping element from said polymeric substrate, whereby said metallized holographic image is transferred to said wrapping paper element and said holographic image on said polymeric substrate may be reused.

DETAILS OF THE INVENTION

Figure 1:
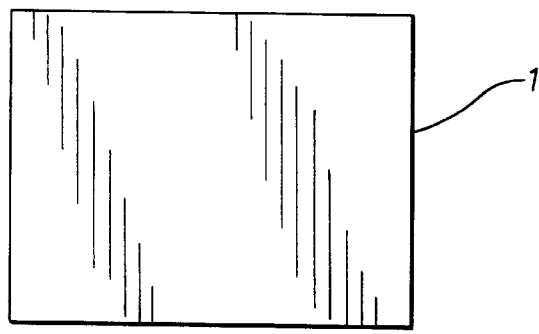
FIG. 1 is a top view of an actual prior art holographic image prepared by the process described above and contained on a polymeric substrate.

Looking now specifically at the drawings which schematically show the holographic image which is transferable from a polymeric substrate to a more useable wrapping paper element, FIG. 1 is a top view of an actual holographic image 1 contained on a polymeric substrate. The image has that 3- or 2-D holographic look that is well-known in the prior art, especially in the security art field.

Figure 2:
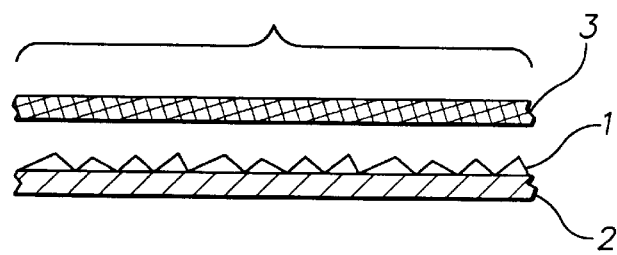
FIG. 2 is a drawing of a side view of FIG. 1. A wrapping paper element is shown directly above the holographic image which is contained on a polymeric substrate in this Figure.

In FIG. 2, a side view drawing of the holographic image 1 from FIG. 2 is shown. In this figure, the polymeric substrate on which the holographic image is manufactured, is shown as 2. A wrapping paper element 3 is shown located directly above the image.

Figure 3:
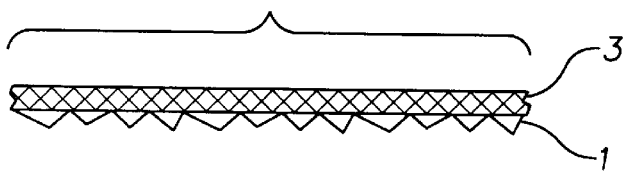
FIG. 3 is a drawing of a side view of a holographic image that has been transferred from the element of FIG. 1 directly to the wrapping paper element of FIG. 2

In FIG. 3, the holographic image 1 has been transferred to the wrapping paper element 3.

Figure 4:
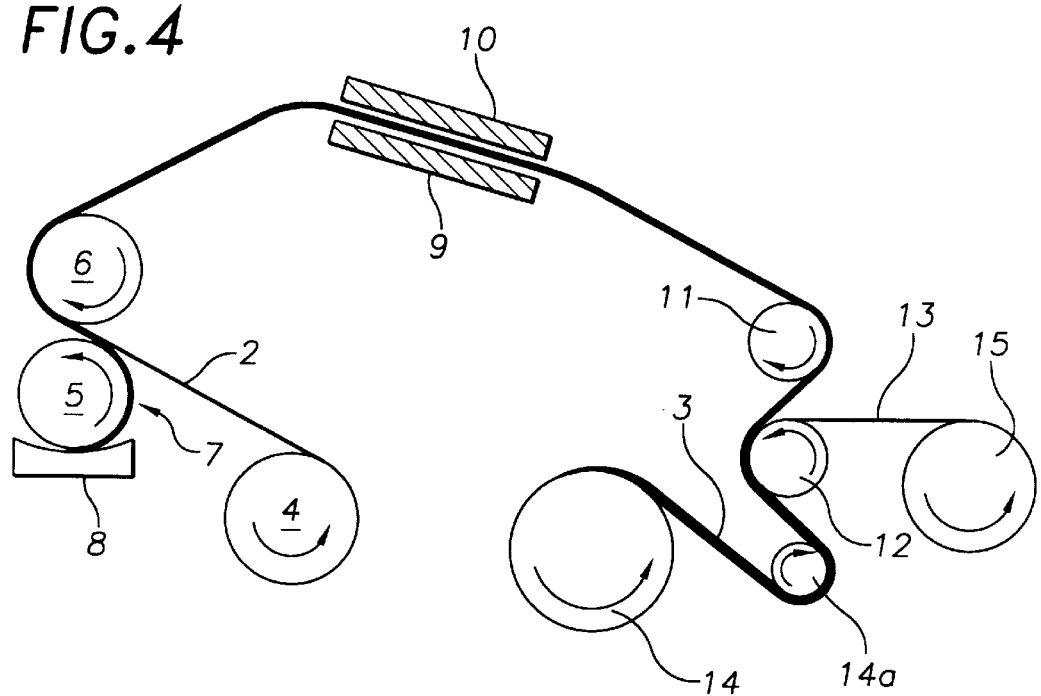
FIG. 4 is a drawing of a schematic process for the lamination of a prior art polymeric substrate containing a holographic image to a wrapping paper element.

FIG. 4 is a schematic drawing representing a novel process of this invention for the transfer of a holographic image from a polymeric substrate to a wrapping paper element. In this figure, a holographic image 1 (not seen in this figure) on a polymeric substrate 2 is shown being pulled off an unwind roll 4 in a nip formed by opposing rollers 5 and 6. In this view, roll 5 is a standard gravure coating roll and roll 6 is a backup roll. A gravure doctor blade (to control coating weight) is shown as 7 and a coating pan (holding a standard adhesive solution) is shown as 8. The coated holographic image on a polymeric substrate is then carried through a drier which is indicated as 9 and 10 and subsequently down to heated rolls 11 and 12. In the nip formed by these last two rolls, a wrapping paper element 3 taken from a roll 14 contacts the surface of the adhesive containing side of the dried, holographic image 1 contained on a polymeric substrate 2 and is laminated thereto. The rolls, which may be heated or cooled, activate the dried adhesive in order to permit such a lamination to occur. The resulting sandwich 13 is then passed over a chill roll 14a and then taken up by rewind roll 14.

Figure 5:
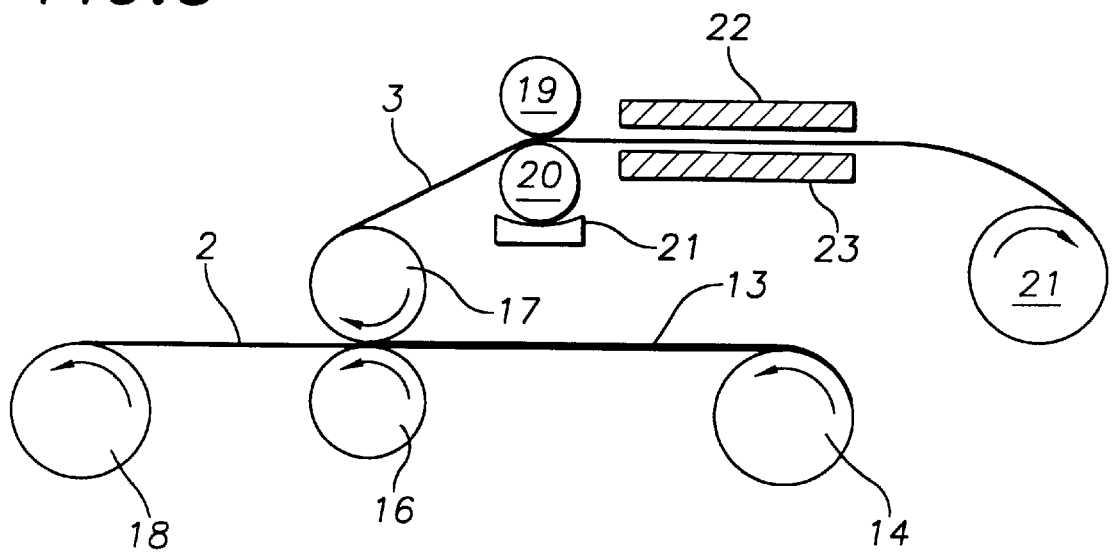
FIG. 5 is a drawing of a schematic process of direct delamination of the polymeric substrate from the wrapping paper element to produce the holographic image of FIG. 2 directly on the wrapping paper element.

The process of delamination is shown in FIG. 5. In this schematic drawing, the laminated sandwich material 13 is drawn off unwind roll 14 and taken through the nip of two delamination rolls 16 and 17. The even pull of the delamination rolls causes the holographic image to transfer from the polymeric substrate 2 to the paper support 3. It is surmised that the holographic image, which has a glue surface on the top surface thereof, has a stronger affinity for the paper support 3 than the polymeric substrate 2. The polymeric substrate 2 is then taken up on a film rewind roll 18 (this material can subsequently be reused and recycled by re-metallizing the image that has been etched thereon). The wrapping paper element 3 now carrying the holographic image 1 thereon is taken up to coating heads 19 and 20. A protective layer may be applied over the holographic image contained on this wrapping paper element in order to protect this image during handling. This may be applied at the nip of the coating heads and a pan 21 is graphically shown in this view. The holographic image on the wrapping paper element is then carried into another drier to insure that the protective coating is hardened prior to be rolled up on to a final roll 21. The roll of holographically imaged paper is now ready for use as a wrap for food products and the like.

Figure 6:
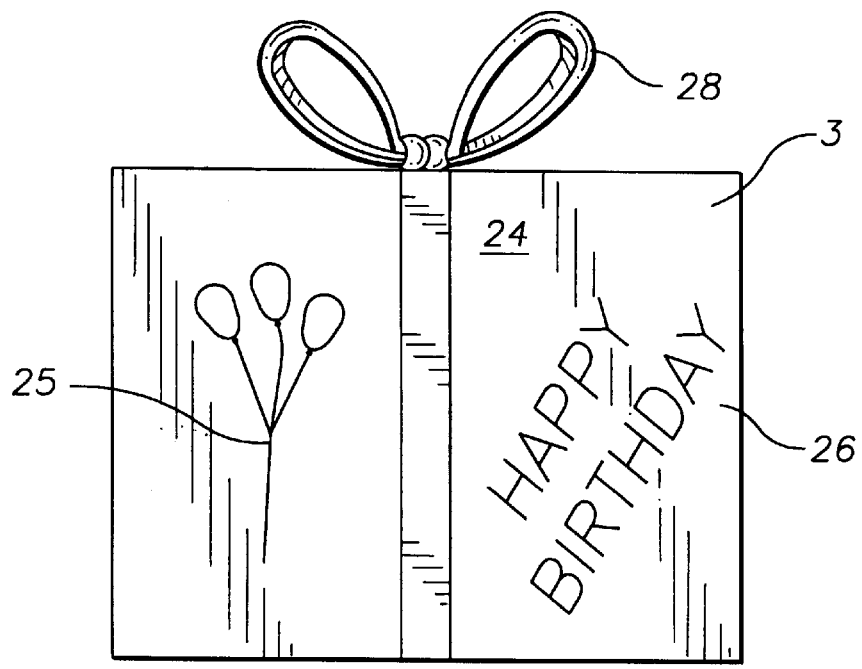
FIG. 6 is a side view of a gift wrapped in the holographic material of this invention. Decorative elements and words have been holographically transferred to wrapping papers in order to enhance the gift wrap itself.

In FIG. 6, a side view of a gift 24 wrapped in the wrapping paper element 3 of this invention is shown. Some decorative balloons 25 and some wording 26, all in holographic imagery, are also shown. The package is also wrapped with a ribbon 28. This package, which is extremely decorative and novel, can contain a host of holographic images thereon. These can be applied The holographic image, transferred to the wrapping paper element, is flashy and eye catching and this is the first such use thereof. The novel wrapping paper can also be used to wrap food elements.

Although a variety of temperatures can be used within the ambit of this invention, I prefer a range of temperatures between 0° C. and 250° C. with a range of between 0° C. to 125° C. and more preferably at temperatures of between 25° C. to 100° C. at the nip of the lamination process of this invention. At the same time, a suitable pressure is applied to the nip to cause the two substrates, with the holographic image sandwiched between, to be laminated together. A pressure greater than 0.25 pounds per square inch and up to 1,000 pounds per square inch may be used, although I prefer 5 to 10 pounds per square inch.

It is most important that the temperature of any step of this process not be greater than 250° C. in order not to harm or deform the holographic images in any way. It was previously thought that since the material that made up a holographic image and the glues used therewith, would begin to degrade at 150° C. However, new materials and glues and the like can be heated at even higher temperatures. Looking again at FIG. 4, the conditions in the drier should be such that the surface of the polymeric substrate 2 carrying the holographic image 1 and a layer of adhesive material, be somewhere between 0° C. and 250° C. and most preferably 25 to 125 degrees Centigrade. One can design a drier which has a proper length and can emanate the proper degree of heat to match up with the web speed which is passing through this drier. The heated nip also should have a temperature of between 0° C. and 250° C. The purpose of the chill roll 14a is to set up the adhesive and insure that the wrapping paper element 3 and holographic image 1 on the polymeric substrate 2 is secured. The adhesive material is well-known in the coating art and can be applied at a coating weight of between 0.5 to 14 pounds (dry) per ream of paper, wherein a ream is 500 sheets of paper of 24 inches by 36 inches in size, and can be applied either to the wrapping paper element or to the holographic image layer. Within the drawings which make up some of the best modes as envisioned at the time of filing of this invention, the adhesive layer is shown being applied to the holographic image first. Then, the wrapping paper element contacts this layer at the heated nip rolls and is adhered thereto.

The protective layer that is applied over the top of the holographic image that has been transferred to the wrapping paper element by delamination, as shown in FIG. 5, can be any of a host of conventional materials such as solvent or water based acrylics, for example. This protective layer may be colored or tinted to provide requisite color matching to colored paper layers, for example.

I can use a host of wrapping paper elements within the metes and bounds of this invention. For example, if one wishes to have holographically enhanced wrapping paper for a host of applications, regular wrapping paper may be used within the ambit of this invention. By wrapping paper I mean that which is said to have 20 to 75 pounds per ream and preferably 30 to 50 pounds per ream, where a ream is 500 sheets of paper of 24 inches by 36 inches in size. This wrapping paper element is particularly useful in the gift wrapping industry and also in the advertising industry.

The conventionally holographically imaged polymeric substrates include many of the commonly available plastics, for example. These will include polyethylenes, polypropylenes, polyethylene terephthalates, among others, for example. These substrates are usually 0.03 to 4.0 mils in thickness.

The wrapping paper elements on which the holographic images have been transferred may be used in a host of applications including the wrapping of gifts; store wrappings; decorative wrappings; wrapping of food products for advertising, etc. The holographic image may be altered for the use desired. Advertising and decorative images are also envisioned within this invention. Such applications will find wide use within the various industries that employ wrappings of this sort.

The ability to dry-bond laminate and then to delaminate the elements described within this invention represents a unique process since it was not widely known that holographic images could be so transferred. The process as described above uses some unique equipment that is designed to hold, laminate and then delaminate wrapping paper elements. It was not known in the prior art to provide such decorative wrapping papers. It is necessary to insure that all of the elements of the process are carefully maintained within processing limits. The use of elements produced within the scope of this invention greatly increases the utility of holographic images within a broader scope. This means that holographic images with larger images, images that can utilize advertising and logos and the like, are now possible.

I claim:

1. A wrapping paper element having a metallized holographic image adhered thereon, said metallized holographic image having been transferred to said wrapping paper element from a second support, said second support comprising in order:

a. a polymeric support having a holographic image therein;

b. a metal applied over said holographic image to enhance said holographic image by metallization thereof, said metal forming the metallized holographic image; and, c. an adhesive layer coated on said metallized holographic image on said polymeric support and subsequently dried, wherein said metallized holographic image is transferred to said wrapping paper element by laminating said dried adhesive layer of said second support to said wrapping paper element at a temperature between 0° C. and 250° C. and a pressure between 0.15 and 1,000 pounds per square inch and then delaminating the polymeric support having a holographic image therein from the metallized holographic image to substantially transfer all of said metallized holographic image to said wrapping paper element leaving said polymeric support having said holographic image remaining therein capable of being re-metallized for re-use.

2. The wrapping paper element of claim 1 wherein a protective layer is applied over said transferred metallized holographic image contained thereon.

3. The wrapping paper element of claim 1 wherein said temperature is between 25° C. and 125° C. and said pressure is between 5 to 10 pounds per square inch.

4. The wrapping paper element of claim 1, wherein said wrapping paper element has a weight of between 20 and 75 pounds per ream, wherein said ream is 500 sheets of 24 by 36 inch paper.

5. A process for transferring a metallized holographic image contained on a polymeric support to a wrapping paper element wherein said polymeric support comprises in order:

a. a polymeric support having a holographic image therein;

b. a metal applied over said holographic image to enhance said holographic image by metallization thereof, said metal forming the metallized holographic image; and, c. an adhesive layer coated on said metallized holographic image on said polymeric support and subsequently dried, wherein said process comprise laminating said adhesive layer of said polymeric support to said wrapping paper element at a temperature of between 0° C. and 250° C. and a pressure between 0.15 and 1,000 pounds per square inch and then delaminating the polymeric support having a holographic image therein from the metallized holographic image to substantially transfer all of said metallized holographic image to said wrapping paper element leaving said polymeric support having said holographic image remaining therein capable of being re-metallized for re-use.

6. The process of claim 5 wherein a protective layer is applied over said transferred metallized holographic image contained thereon.

* * * * *